US012260987B2

(12) United States Patent
Arai et al.

(10) Patent No.: US 12,260,987 B2
(45) Date of Patent: Mar. 25, 2025

(54) METHOD OF MANUFACTURING COIL COMPONENT

(71) Applicant: TAIYO YUDEN CO., LTD., Tokyo (JP)

(72) Inventors: Takayuki Arai, Tokyo (JP); Tomoo Kashiwa, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 18/609,705

(22) Filed: Mar. 19, 2024

(65) Prior Publication Data

US 2024/0222007 A1 Jul. 4, 2024

Related U.S. Application Data

(63) Continuation of application No. 17/566,989, filed on Dec. 31, 2021, now Pat. No. 11,996,233.

(30) Foreign Application Priority Data

Feb. 12, 2021 (JP) ................................ 2021-020895

(51) Int. Cl.
*H01F 41/04* (2006.01)
*B22F 1/16* (2022.01)
(Continued)

(52) U.S. Cl.
CPC ................ *H01F 41/04* (2013.01); *B22F 1/16* (2022.01); *H01F 1/26* (2013.01); *H01F 17/04* (2013.01);
(Continued)

(58) Field of Classification Search
CPC ........ H01F 41/04; H01F 41/0246; H01F 1/26; H01F 17/04; H01F 27/2852;
(Continued)

(56) References Cited

U.S. PATENT DOCUMENTS

2016/0293321 A1* 10/2016 Takeoka .................... H01F 1/14
2019/0103207 A1 4/2019 Sato
2019/0272947 A1 9/2019 Uematsu et al.

FOREIGN PATENT DOCUMENTS

JP 2019-153650 A 9/2019

* cited by examiner

*Primary Examiner* — Adil A. Siddiqui
(74) *Attorney, Agent, or Firm* — Pillsbury Winthrop Shaw Pittman, LLP

(57) ABSTRACT

A method of manufacturing a coil component includes providing an intermediate body, heating the intermediate body at a first temperature ranging from 100 to 350° C., and after the heating at the first temperature, heating the intermediate body at a higher second temperature ranging from 600 to 900° C. The providing of the intermediate body including (i) preparing a base material having a flat plate shape or a wire shape, (ii) bending the base material to form a conductor portion, (iii) preparing a metal magnetic paste containing a resin and a plurality of metal magnetic particles mainly composed of iron, and (iv) applying a molding pressure to the metal magnetic paste covering the base material to form the intermediate body including a substrate body containing the plurality of metal magnetic particles and the conductor portion. The magnetic base body including an oxide coating film containing iron oxide on a surface of each of the metal magnetic particles.

20 Claims, 8 Drawing Sheets

(51) Int. Cl.
*H01F 1/26* (2006.01)
*H01F 17/04* (2006.01)
*H01F 27/28* (2006.01)
*H01F 27/29* (2006.01)
*H01F 41/02* (2006.01)

(52) U.S. Cl.
CPC ....... *H01F 27/2852* (2013.01); *H01F 27/292* (2013.01); *H01F 41/0246* (2013.01); *B22F 2998/10* (2013.01); *B22F 2999/00* (2013.01)

(58) Field of Classification Search
CPC ...... H01F 27/292; B22F 1/16; B22F 2998/10; B22F 2999/00; B22F 3/02; B22F 3/1007; B22F 3/1017; B22F 2201/03; B22F 1/107; B22F 1/052
See application file for complete search history.

METHOD OF MANUFACTURING COIL COMPONENT

CROSS-REFERENCE TO RELATED APPLICATIONS

This application is a continuation of U.S. patent application Ser. No. 17/566,989 (filed on Dec. 31, 2021), which claims the benefit of priority from Japanese Patent Application Serial No. 2021-020895 (filed on Feb. 12, 2021), the contents of which are hereby incorporated by reference in their entirety.

TECHNICAL FIELD

The present disclosure relates to a method of manufacturing a coil component.

BACKGROUND

Japanese Patent Application Publication No. 2019-153650 ("the '650 Publication") discloses a coil component including a magnetic base body and a conductor portion formed by bending a metal base material shaped like a flat plate.

In the conductor portion formed by bending the metal base material shaped like a flat plate, the portion plastically deformed by the bending experiences residual stress. Therefore, the coil component having the conductor portion formed by bending is likely to have lowered mechanical strength.

Coil components may be used in environments where they are constantly vibrated. For example, when used in electrical components in automobiles, coil components are repeatedly vibrated while the automobiles are traveling. If the coil component including the conductor portion formed by bending is repeatedly vibrated, the portion plastically deformed by the bending is more susceptible to fatigue-induced cracks.

In the conventional art, it is known that a product made by bending a base material made of a metal material may experience residual stress, and the residual stress can be relieved by annealing. Since conductor portions used in coil components are mainly composed of metals such as copper and silver, the annealing is required to involve heating at a high temperature of 500° C. or more in order to allow the annealing to relieve the residual stress created in the conductor portions. If the conductor portions are heated at such a high temperature, the conductor portions may be oxidized, resulting in higher electrical resistance.

In addition, the conductor portions are embedded in magnetic base bodies, but some of the materials used to form the magnetic base bodies do not allow high-temperature annealing after the embedding of the conductor portions in the magnetic base bodies. For example, the magnetic base body of the coil component disclosed in the '650 Publication contains a resin binder that bonds the metal magnetic particles to each other. If the magnetic base body is heated at a temperature sufficiently high to be capable of relieving the residual stress in the conductor portion, the binder may be thermally decomposed, weakening the bonds between the metal magnetic particles. As noted, depending on the materials of the magnetic base body, it may be difficult to relieve the residual stress in the conductor portion by performing annealing during the manufacturing process.

To address this issue, it may be suggested to manufacture a coil component by bending and annealing a metal base material into a metal plate free from residual stress and burying the metal plate free from the residual stress in a magnetic base body. This manufacturing process, however, requires an additional and independent heating step in order to relieve the residual stress in the metal plate and is thus inefficient.

SUMMARY

An object of the present invention is to solve or relieve at least a part of the above problem. More specifically, an object of the present invention is to provide an efficient method of manufacturing a coil component that is capable of relieving residual stress in a conductor portion that is made by bending and buried in a magnetic base body while preventing oxidization of the conductor portion.

Other objects of the disclosure will be made apparent through the entire description in the specification. The invention disclosed herein may also address any other drawbacks in addition to the above drawback.

According to one embodiment of the present invention, a method of manufacturing a coil component includes steps of providing an intermediate body including a conductor portion and a substrate body surrounding at least part of the conductor portion, where the conductor portion is formed by bending a base material mainly composed of a metal having a lower ionization tendency than iron, and the substrate body contains a plurality of metal magnetic particles mainly composed of iron, heating the intermediate body at a first temperature, so that an oxide film containing an oxide of the metal is formed to cover a surface of the conductor portion, and after the heating at the first temperature, heating the intermediate body at a second temperature higher than the first temperature (i) to form an oxide coating film containing iron oxide on a surface of each of the metal magnetic particles so that the substrate body is formed into a magnetic base body, (ii) to form the oxide film into an insulating oxide layer containing iron oxide and the metal, and (iii) to anneal the conductor portion.

According to one embodiment of the present invention, a method of manufacturing a coil component includes steps of providing an intermediate body including a base material and a substrate body, where the base material is mainly composed of a metal having a lower ionization tendency than iron, and the substrate body contains a plurality of metal magnetic particles mainly composed of iron and surrounding at least part of the base material, heating the intermediate body at a first temperature, so that an oxide film containing an oxide of the metal is formed to cover a surface of the base material, after the heating at the first temperature, bending the base material into a conductor portion, and after the bending, heating the intermediate body at a second temperature higher than the first temperature (i) to form an oxide coating film containing iron oxide on a surface of each of the metal magnetic particles so that the substrate body is formed into a magnetic base body, (ii) to form the oxide film into an insulating oxide layer containing iron oxide and the metal, and (iii) to anneal the conductor portion.

In one embodiment of the present invention, the heating at the second temperature reduces at least part of the oxide of the metal contained in the oxide film.

In one embodiment of the present invention, in the heating at the second temperature, each of the metal magnetic particles binds to an adjacent one of the metal magnetic particles via the oxide coating film, so that the magnetic base body is formed.

In one embodiment of the present invention, in the heating at the second temperature, the intermediate body is heated within an atmosphere with a lower oxygen concentration than in the heating at the first temperature.

In one embodiment of the present invention, the base material is covered with a thermally decomposable insulating coating film, and the insulating coating film is decomposed in the heating at the first temperature.

In one embodiment of the present invention, the providing of the intermediate body includes applying a suspension containing zinc oxide onto a surface of the base material.

In one embodiment of the present invention, in the heating at the second temperature, the oxide layer formed contains zinc oxide.

In one embodiment of the present invention, the first temperature is in a range of 100° C. to 350° C.

In one embodiment of the present invention, the second temperature is in a range of 600° C. to 900° C.

In one embodiment of the present invention, the heating at the second temperature is performed within an atmosphere having an oxygen concentration of 100 to 2000 ppm.

Advantageous Effects

The invention disclosed herein can provide a method of manufacturing a coil component that is capable of relieving residual stress in a conductor portion that is made by bending and buried in a magnetic base body while preventing oxidization of the conductor portion.

DESCRIPTION OF THE PREFERRED EMBODIMENTS

The following describes various embodiments of the present invention by referring to the appended drawings as appropriate. The constituents common to more than one drawing are denoted by the same reference signs throughout the drawings. It should be noted that the drawings are not necessarily drawn to an accurate scale for the sake of convenience of explanation. The following embodiments of the present invention do not limit the scope of the claims. The elements described in the following embodiments are not necessarily essential to solve the problem to be solved by the invention.

Figure 1:
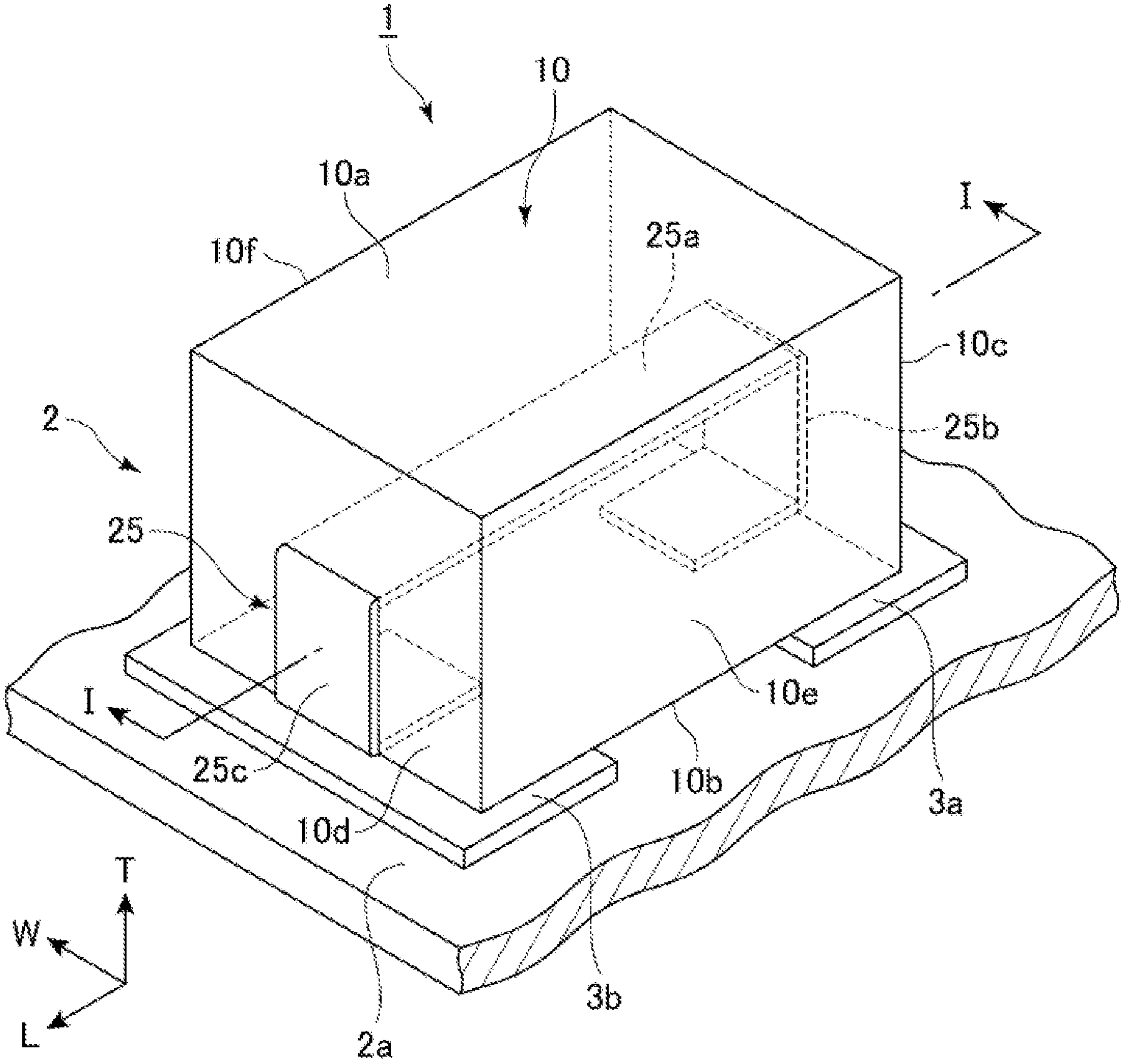
FIG. 1 is a perspective view of a coil component according to one embodiment of the invention, which is mounted on a mounting substrate.
Figure 2:
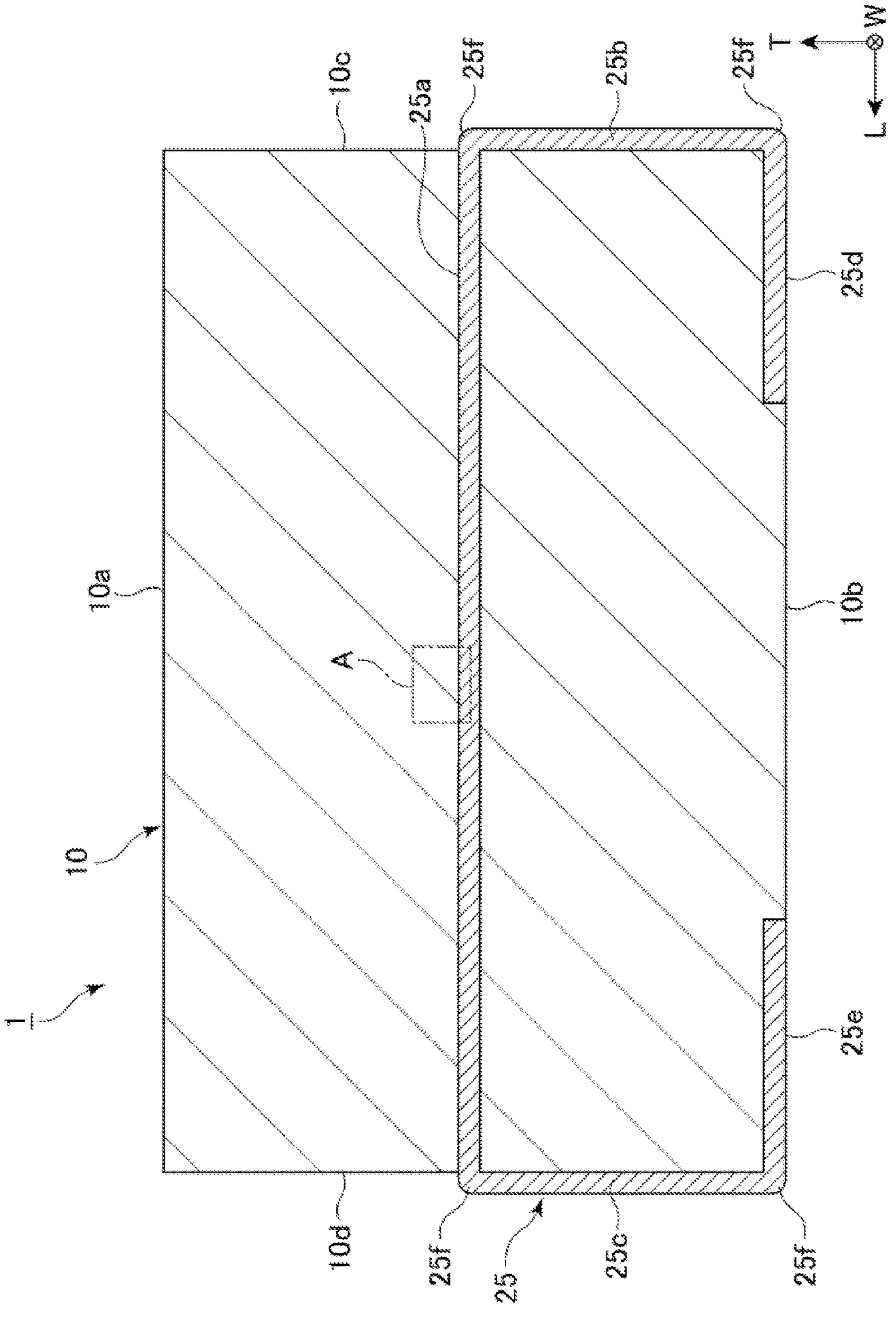
FIG. 2 is a sectional view of the coil component of FIG. 1 along the line I-I.
Figure 3:
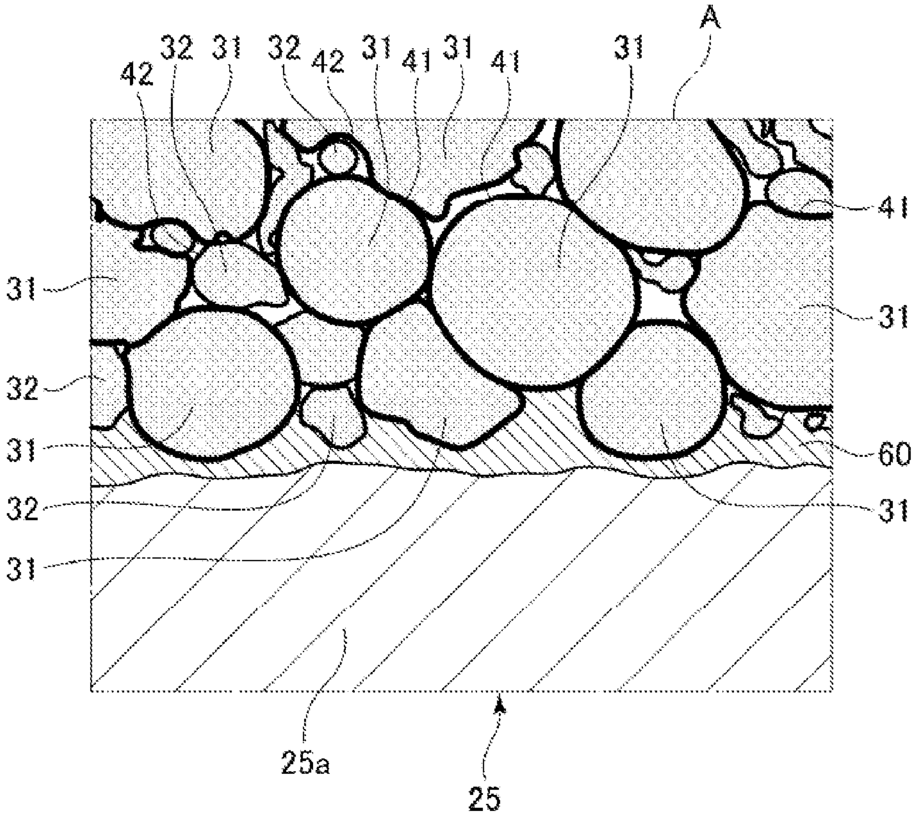
FIG. 3 is an enlarged sectional view showing a part of the section shown in FIG. 2 on an enlarged scale.

A coil component 1 according to one embodiment of the invention will be hereinafter described with reference to FIGS. 1 to 3. FIG. 1 is a perspective view of the coil component 1 mounted on a mounting substrate 2*a*, FIG. 2 is a sectional view of the coil component 1 along the line I-I, and FIG. 3 is an enlarged sectional view showing a part of the section shown in FIG. 2 in an enlarged scale. FIGS. 1 and 2 show a W axis, an L axis, and a Taxis orthogonal to one another. In this specification, a "length" direction, a "width" direction, and a "thickness" direction of the coil component 1 are referred to as an "L-axis" direction, a "W-axis" direction, and a "T-axis" direction in FIG. 1, respectively, unless otherwise construed from the context. Herein, orientations and arrangements of the constituent members of the coil component 1 may be described based on the L-, W- and T-axis directions.

The coil component 1 may be applied to inductors, transformers, filters, reactors, and various other coil components. The coil component 1 may also be applied to coupled inductors, choke coils, and various other magnetically coupled coil components. Applications of the coil component 1 are not limited to those explicitly described herein.

As shown in FIGS. 1 and 3, the coil component 1 includes a magnetic base body 10 made of a magnetic material, a conductor portion 25 in the magnetic base body 10 and an oxide layer 60 between the conductor portion 25 and the magnetic base body 10.

The coil component 1 is mounted on the mounting substrate 2*a*. The mounting substrate 2*a* has lands 3*a* and 3*b* provided thereon. The coil component 1 is mounted on the mounting substrate 2*a* by bonding an exposed portion 25*b* of the conductor portion 25 to the land 3*a* and bonding an exposed portion 25*c* of the conductor portion 25 to the land 3*b*. The coil component 1 and the mounting substrate 2*a* having the coil component 1 mounted thereon constitute a circuit board 2. The circuit board 2 may include the coil component 1 and various electronic components in addition to the coil component 1.

The circuit board 2 can be installed in various electronic devices. The electronic devices in which the circuit board 2 may be installed include smartphones, tablets, game consoles, electrical components of automobiles, servers and various other electronic devices. The electronic devices in which the coil component 1 may be installed are not limited to those specified herein. The coil component 1 may be a built-in component embedded in the circuit board 2.

In the embodiment shown, the magnetic base body 10 has a rectangular parallelepiped shape as a whole. The magnetic base body 10 has a first principal surface 10*a*, a second principal surface 10*b*, a first end surface 10*c*, a second end surface 10*d*, a first side surface 10*e*, and a second side surface 10*f*, and the six surfaces define the outer surface of the magnetic base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. In FIG. 1, the first principal surface 10*a* lies on the top side of the base body 10, and therefore, the first principal surface 10*a* may be herein referred to as "the top surface." Similarly, the second principal surface 10*b* may be referred to as a "bottom surface." The magnetic coupling coil component 1 is disposed such that the second principal surface 10*b* faces the mounting substrate 2*a*, and therefore, the second principal surface 10*b* may be herein referred to as "the mounting surface." The top-bottom direction of the coil component 1 refers to the top-bottom direction in FIG. 1. As used herein, the "length" direction, the "width" direction, and the "thickness" direction of the coil component 1 respectively represent the "L axis" direction, the "W axis" direction, and the "T axis" direction in FIG. 1, unless otherwise construed from the context. The L axis, the W axis, and the Taxis are orthogonal to one another.

In one or more embodiments of the present invention, the magnetic base body 10 of the coil component 1 has a length (the dimension in the direction of the L axis) of 1.0 to 12.0 mm, a width (the dimension in the direction of the W axis) of 1.0 to 12.0 mm, and a height (the dimension in the direction of the T axis) of 1.0 to 6.0 mm. The coil component 1 may have a length (the dimension in the direction of the L axis) of 0.2 to 6.0 mm, a width (the dimension in the direction of the W axis) of 0.1 to 4.5 mm, and a height (the dimension in the direction of the T axis) of 0.1 to 4.0 mm. These dimensions are mere examples, and the coil component 1 to which the present invention is applicable can have any dimensions that conform to the purport of the present invention.

The magnetic base body 10 is made of a magnetic material. In one or more embodiments of the present invention, the magnetic base body 10 contains a plurality of metal magnetic particles. The metal magnetic particles can be particles or powders of soft magnetic metal materials. The metal magnetic particles contain a metal element having a higher ionization tendency than copper. The metal magnetic particles are powders of an Fe—Cr—Si based alloy, for example. Here, Fe and Cr have a higher ionization tendency than copper (Cu). The soft magnetic metal material used to provide the metal magnetic particles is not limited to an Fe—Cr—Si based alloy. The soft magnetic metal material used to provide the metal magnetic particles is, for example, (1) alloys such as Fe—Si—Al or Fe—Ni, (2) amorphous materials such as Fe—Si—Cr—B—C or Fe—Si—B—Cr, or (3) any combination thereof. When the metal magnetic particles are of an alloy-based material, the Fe content in the metal magnetic particles may be 80 wt % or more but less than 97 wt %. When the metal magnetic particles are of an amorphous material, the Fe content in the metal magnetic particles may be 72 wt % or more but less than 85 wt %. In the metal magnetic particles, metal elements that are more susceptible to oxidation than Si and Cu may account for, in total, 3 wt % or more, 8 wt % or more, or 10 wt % or more.

In one or more embodiments of the present invention, the particle sizes of the metal magnetic particles contained in the magnetic base body 10 are distributed according to a predetermined particle size distribution. The average particle size of the metal magnetic particles is no less than 1 μm and no more than 10 μm, for example. The average particle size of the metal magnetic particles contained in the magnetic base body 10 is determined based on a particle size distribution. To determine the particle size distribution, the magnetic base body 10 is cut along the thickness direction (T-axis direction) to expose a section, and the section is scanned by a scanning electron microscope (SEM) to take a photograph at a 1000 to 5000-fold magnification, and the particle size distribution is determined for the metal magnetic particles in the section based on the SEM photograph. For example, the value at 50 percent of the particle size distribution determined based on the SEM photograph can be set as the average particle size of the metal magnetic particles. The magnetic base body 10 may be constituted by metal magnetic particles of a single type or by metal magnetic particles of two or more types made of different materials and/or having different average particle sizes. When the magnetic base body 10 is constituted by metal magnetic particles of two or more types, different soft magnetic metal materials may be used to constitute the metal magnetic particles of two or more types. For example, the magnetic base body 10 may contain particle mixture obtained by mixing metal magnetic particles of an Fe—Cr—Si based alloy and metal magnetic particles of an Fe—Ni based alloy. When the magnetic base body 10 is constituted by metal magnetic particles of two or more types, the metal magnetic particles of the two or more types may have different average particle sizes. The fact that the magnetic base body 10 contains particle mixture obtained by mixing together metal magnetic particles of two or more types having different average particle sizes can be confirmed by creating a particle size distribution based on a SEM photograph and identifying two or more peaks in the particle size distribution.

The conductor portion 25 includes a buried portion 25*a* arranged in the magnetic base body 10, an exposed portion 25*b* connected to one of the ends of the buried portion 25*a* and extending along the first end surface 10*c* of the magnetic base body 10, an exposed portion 25*c* connected to the other end of the buried portion 25*a* and extending along the second end surface 10*d* of the magnetic base body 10, a connecting portion 25*d* connected to the exposed portion 25*b* and extending along the bottom surface 10*b* of the magnetic base body 10, and a connecting portion 25*e* connected to the exposed portion 25*c* and extending along the bottom surface 10*b* of the magnetic base body 10. The connecting portions 25*d* and 25*e* extend along the bottom surface 10*b* of the magnetic base body 10, and are respectively connected to the lands 3*a* and 3*b* when the coil component 1 is mounted onto the mounting substrate 2*a*.

The conductor portion 25 is made by, for example, bending a metal base material shaped like a flat plate or wire. The conductor portion 25 has curved portions 25*f* at the boundary between the buried portion 25*a* and the exposed portion 25*b*, the boundary between the buried portion 25*a* and the exposed portion 25*c*, the boundary between the exposed portion 25*b* and the connecting portion 25*d*, and the boundary between the exposed portion 25*c* and the connecting portion 25*e*. The curved portions 25*f* may be made by bending the base material.

The conductor portion 25 applicable to the invention is not limited to the illustrated example. The exposed portions 25*b* and 25*c* can be shaped in any manner and arranged at any position on the magnetic base body 10 as long as they are exposed through the magnetic base body 10. The conductor portion 25 may not have the connecting portions 25*d* and 25*e*. When the exposed portions 25*b* and 25*c* end before reaching the mounting surface 10*b* or the conductor portion 25 does not have the connecting portions 25*d* and 25*e*, the coil component 1 may include two external electrodes connected to the exposed portions 25*b* and 25*c*. In this case, the external electrodes can be formed using known external electrodes. The external electrodes can be formed by, for example, applying a conductive paste onto the surface of the magnetic base body 10 to form a base electrode and forming one or more plating layers on the surface of the base electrode. When the conductor portion 25 does not have the connecting portions 25*d* and 25*e*, the exposed portions 25*b* and 25*c* may be directly or indirectly connected to the lands 3*a* and 3*b* of the mounting substrate 2*a*.

The conductor portion 25 is a conductive structure the main component of which is a metal having a lower ionization tendency than iron. The term "main component" used herein refers to a component contained at the largest proportion by mass. As used herein, "the main component metal of the conductor portion 25" or simply "the main component metal" refers to the metal that mainly composes the metal material of the conductor portion 25. The main component metal of the conductor portion 25 is, for example, copper or silver. When the main component of the conductor portion 25 is copper, this means that copper accounts for the largest proportion by mass. The copper or silver content in the conductor portion 25 may be 90 wt % or more, 95 wt % or more, 99 wt % or more, or any higher, in order to lower the electric resistance. In addition to the main component metal, the conductor portion 25 can contain Ni, Sn, Zn and/or other elements.

The shape of the conductor portion 25 applicable to the invention is not limited to the illustrated shape. The buried portion 25*a* of the conductor portion 25 may be spirally shaped. The spirally shaped buried portion 25*a* may spirally extend around an axis passing through the intersection of the diagonal lines of the first principal surface 10*a*, which is rectangularly shaped as seen from above, and extending perpendicularly to the first principal surface 10*a* (in the T-axis direction). The exposed portions 25*b* and 25*c* and/or the connecting portions 25*d* and 25*e* may also have other shapes than the illustrated shape. In the conductor portion 25 shown, the buried portion 25*a* has the same sectional shape as the exposed portions 25*b* and 25*c*. The buried portion 25*a* of the conductor portion 25 may have a circular or oval sectional shape. The conductor portion 25 may be made from a wire shaped like a straight line and having a wire diameter of 1.5 mm. The exposed portions 25*b* and 25*c* may be produced by stamping such a wire. The exposed portions 25*b* and 25*c* may have a thickness of, for example, 0.1 mm to 0.5 mm.

In the case of the spirally-shaped buried portion 25*a*, the buried portion 25*a* extends around the coil axis. The spirally-shaped buried portion 25*a* may be wound more than one turn around the coil axis. The coil axis may refer to an imaginary axis extending along one of the T-, L- and W-axes. When the buried portion 25*a* is wound multiple turns around the coil axis, part of the magnetic base body 10 may be interposed between adjacent ones of the turns of the buried portion 25*a*. Between adjacent ones of the turns of the buried portion 25*a*, which is wound multiple turns around the coil axis, an insulating material mainly composed of an oxide of the main component metal of the conductor portion 25 may be interposed.

The following now describes the microscopic structure in the vicinity of the boundary between the magnetic base body 10 and the buried portion 25*a* of the conductor portion 25 with reference to FIG. 3. FIG. 3 is an enlarged cross-sectional view showing, on an enlarged scale, a region A of the section of the coil component 1 shown in FIG. 2. The region A covers the buried portion 25*a* of the conductor portion 25 and the magnetic base body 10. According to the example shown in FIG. 3, the magnetic base body 10 contains metal magnetic particles of two types having different average particle sizes, specifically, contains a plurality of first metal magnetic particles 31 and a plurality of second metal magnetic particles 32 having a smaller average particle size than the first metal magnetic particles 31. The first and second metal magnetic particles 31 and 32 are made of a soft magnetic metal material mainly composed of iron. The first and second metal magnetic particles 31 and 32 may be particles of, for example, (1) alloys such as Fe—Si—Cr, Fe—Si—Al or Fe—Ni, (2) amorphous materials such as Fe—Si—Cr—B—C or Fe—Si—B—Cr, or (3) any combination thereof.

An insulating oxide coating film is formed on the surface of the metal magnetic particles included in the magnetic base body 10. The insulating oxide coating film contains an oxide of a metal element contained in the metal magnetic particles. As illustrated in FIG. 3, an oxide coating film 41 is provided on the surface of the first metal magnetic particles 31, and an oxide coating film 42 is provided on the surface of the second metal magnetic particles 32. The oxide coating films 41 and 42 contain an oxide of Fe. The oxide coating films 41 and 42 may contain an oxide of the other elements constituting the metal magnetic particles than Fe. For example, when the metal magnetic particles are formed of an Fe—Cr—Si based alloy, the oxide coating film on the surface of the metal magnetic particles contains an oxide of Fe, Cr and Si. The first metal magnetic particles 31 bind to adjacent ones of the first and second metal magnetic particles 31 and 32 via the oxide coating film 41 and/or the oxide coating film 42.

Between the buried portion 25*a* of the conductor portion 25 and the first and second metal magnetic particles 31 and 32, the oxide layer 60 is arranged and covers the surface of the buried portion 25*a*. The oxide layer 60 may be in contact with the buried portion 25*a*. The oxide layer 60 is provided between the buried portion 25*a* and the first and second metal magnetic particles 31 and 32 such that the oxide layer 60 can fill the space between the buried portion 25*a* and the first and second metal magnetic particles 31 and 32. The oxide layer 60 is in contact with the first metal magnetic particles 31 via the oxide coating film 41 and with the second metal magnetic particles 32 via the oxide coating film 42. There may be voids between the oxide layer 60 and the first and/or second metal magnetic particles 31, 32.

As illustrated, the oxide layer 60 may cover the entire surface of the buried portion 25*a*. For example, the oxide layer 60 can be deemed to cover the entire surface of the buried portion 25*a* in the following manner. The magnetic base body 10 is cut along the T-axis to expose a section at three (five or more) sites evenly spaced away from each other in the L-axis direction, and the exposed sections are image-captured using the SEM technique at a 5000-fold magnification such that the obtained SEM photographs can include part of the surface of the buried portion 25*a* and the magnetic base body 10. If the entire surface of the buried portion 25*a* is covered with the oxide layer 60 in every one of the SEM photographs, the oxide layer 60 can be deemed to cover the entire surface of the buried portion 25*a*. As described above, the oxide layer 60 covers the surface of the buried portion 25*a* of the conductor portion 25 and fills the space between the buried portion 25*a* and the first and second metal magnetic particles 31 and 32. Accordingly, the present embodiment can partly or totally prevent, when the coil component 1 is in use, the ambient air and moisture in the air from entering the magnetic base body 10 and reaching the buried portion 25*a*.

In one or more embodiments of the present invention, the oxide layer 60 can contain iron oxide and an oxide of other metal element than iron contained in at least one of the first metal magnetic particles 31 or the second metal magnetic particles 32. For example, when the first and second metal magnetic particles 31 and 32 are formed of an Fe—Cr—Si based alloy, the oxide layer 60 can contain an oxide of Fe and Cr. Since the oxide layer 60 contains an oxide of the metal element contained in at least one of the first metal magnetic particles 31 or the second metal magnetic particles 32, the relative permeability of the oxide layer 60 is higher than the relative permeability of the conventional resin (for example, polyimide) insulating coating film.

In one or more embodiments of the present invention, the oxide layer 60 may contain the metal element that mainly composes the conductor portion 25, for example, copper element or silver element, in addition to iron oxide and an oxide of other metal element than Fe contained in at least one of the first metal magnetic particles 31 or the second metal magnetic particles 32. The oxide layer 60 may contain copper element in the form of copper oxide and silver element in the form of silver oxide.

When the section of the magnetic base body 10 is image-captured at a 5,000- to 20,000-fold magnification using the SEM technique, the resulting SEM photograph shows that the difference in brightness can help specify the boundary between the oxide layer 60 and the buried portion 25*a* of the conductor portion 25 and the boundary between the oxide layer 60 and the first and second metal magnetic particles 31 and 32. It can be proved that the oxide layer 60 contains an oxide of the metal element contained in at least one of the first metal magnetic particles 31 or the second metal magnetic particles 32 by subjecting the section of the magnetic base body 10 to energy dispersive X-ray spectroscopy (EDS). More specifically, if the EDS performed on the section of the magnetic base body 10 can confirm that the oxide layer 60 contains oxygen element and a metal element contained in at least one of the first metal magnetic particles 31 or the second metal magnetic particles 32, this can prove that the oxide layer 60 contains an oxide of the metal element contained in at least one of the first metal magnetic particles 31 or the second metal magnetic particles 32. The EDS performed on the section of the magnetic base body 10 can produce mapping data for each element. As the mapping data is reorganized along the scanning line transverse the oxide layer 60 (for example, the line extending in the T-axis direction), the metal element contained in at least one of the first metal magnetic particles 31 or the second metal magnetic particles 32 may increase in abundance along the scanning line as the distance from the buried portion 25*a* increases (toward the first and second metal magnetic particles 31 and 32). In other words, the detected abundance of the metal element contained in at least one of the first metal magnetic particles 31 or the second metal magnetic particles 32 may grow as the distance from the buried portion 25*a* increases. On the other hand, the detected abundance of the main component metal of the conductor portion 25 along the same scanning line may grow as the distance from the buried portion 25*a* decreases.

The oxide layer 60 is highly insulating. The oxide layer 60 exhibits excellent insulation since it contains hematite, silicon dioxide, and/or other insulating oxides. The oxide layer 60 has a high specific resistance of $10^8$ Ω·cm or greater, for example. Since the surface of the buried portion 25*a* of the conductor portion 25 is covered with the insulating oxide layer 60 as described above, the present embodiment can reduce occurrence of short circuits between the conductor portion 25 and the first and second metal magnetic particles 31 and 32. In other words, the coil component 1 has high dielectric strength.

When the buried portion 25*a* is spirally shaped as described above, part of the magnetic base body 10 may be interposed between adjacent ones of the turns of the buried portion 25*a*. In this case, the oxide layer 60 is provided between the surface of the buried portion 25*a* and the region of the magnetic base body 10 that is interposed between adjacent ones of the turns of the buried portion 25*a*. Since the insulating oxide layer 60 separates the adjacent turns from each other, the present embodiment can reduce occurrence of short circuits between portions of the conductor portion 25 that constitute different ones of the turns. Accordingly, the coil component 1 has high dielectric strength.

When the buried portion 25*a* is spirally shaped, it may not be part of the magnetic base body 10 but an insulating member mainly composed of the main component metal of the conductor portion 25 that is interposed between adjacent ones of the turns of the buried portion 25*a*. The insulating member mainly composed of the main component metal of the conductor portion 25 can reduce occurrence of short circuits between portions of the conductor portion 25 that constitute different ones of the turns.

In one or more embodiments of the present invention, the oxide layer 60 contains zinc element. The oxide layer 60 may contain zinc element in the form of zinc oxide. In the oxide layer 60, zinc element accounts for, for example, 1.0 at % to 25 at %. Here, zinc element may be also contained in at least one of the oxide coating film 41 of the first metal magnetic particles 31 or the oxide coating film 42 of the second metal magnetic particles 32. In one or more embodiments, the content (atomic percentage) of zinc element is higher in the oxide layer 60 than in the oxide coating film 41 and in the oxide coating film 42. As containing zinc oxide, the oxide layer 60 can be densified. This can further contribute to prevent the oxygen and moisture in the ambient air from reaching the buried portion 25*a* while the coil component 1 is in use.

Figure 4:
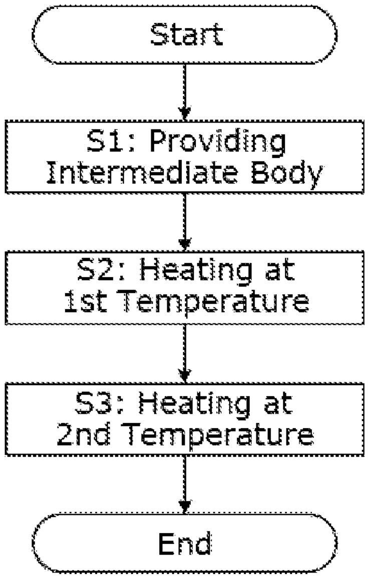
FIG. 4 is a flow chart showing a process of manufacturing a coil component according to one embodiment of the present invention.

The following now describes an example method of manufacturing the coil component 1 relating to one embodiment of the present invention with reference to FIGS. 4 to 9. FIG. 4 is a flow chart showing a process of manufacturing the coil component 1 according to one embodiment of the present invention. In the following, it is assumed that the coil component 1 is manufactured by the compression molding process. The coil component 1 may be manufactured by any known methods in addition to the compression molding process.

Figure 5:
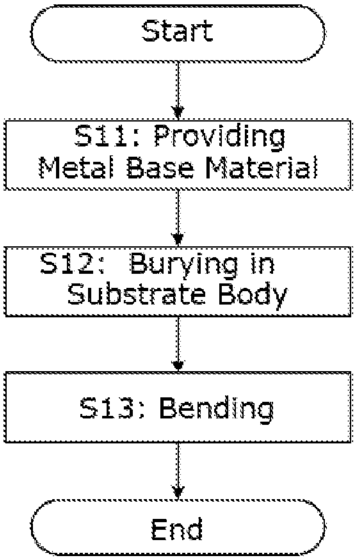
FIG. 5 is a flow chart showing a process of providing an intermediate body according to one embodiment of the present invention.
Figure 6:
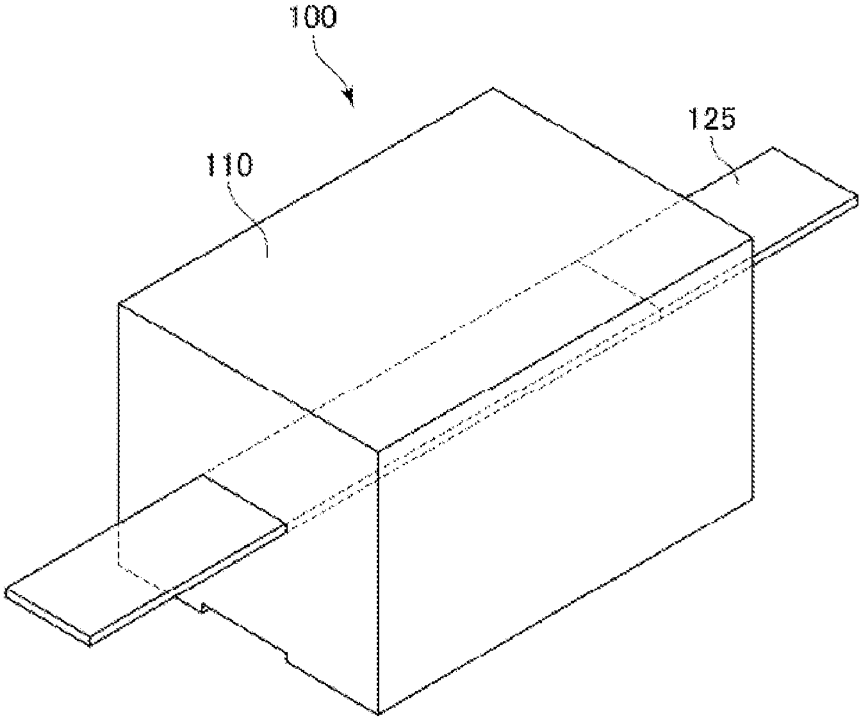
FIG. 6 is a perspective view schematically showing the intermediate body, which is produced during the process of manufacturing the coil component according to one embodiment of the invention.

In the first step S1, an intermediate body 100 is provided. The flow of steps to provide the intermediate body 100 is shown in FIG. 5, and the intermediate body 100 is schematically shown in FIG. 6. As shown in FIG. 6, the intermediate body 100 includes a substrate body 110 made from a magnetic material and a metal base material 125 partly buried in the substrate body 110. The base material 125 is made of a metal material the main component of which is a metal having a lower ionization tendency than iron. As used herein, "the main component metal of the base material 125" refers to the metal that mainly composes the metal material of the base material 125. As will be described below, the conductor portion 25 is made by bending the base material 125. Accordingly, the main component metal of the base material 125 may be the same as the main component metal of the conductor portion 25. In the illustrated embodiment, the base material 125 is a metal flat plate. A resin insulating coating film may or may not be provided on the surface of the base material 125. A suspension, which contains zinc oxide (ZnO) powders dispersed in alcohol, may be applied to a region of the surface of the base material 125 that is buried in the substrate body 110. The shape of the base material 125 is not limited to the flat-plate shape. The base material 125 may be shaped like a wire.

As shown in FIG. 5, the first step S11 of making the intermediate body 100 includes providing the metal base material 125. In the next step S12, the base material 125 is buried in the substrate body 110. For example, the base material 125 is placed in a mold, a metal magnetic paste containing metal magnetic particles is poured into the mold where the base material 125 is placed, and predetermined molding pressure (for example, 500 kN to 5000 kN) is applied to the metal magnetic paste in the mold, thereby shaping the metal magnetic paste into the substrate body 110 and burying part of the base material 125 in the substrate body 110. In one embodiment, the molding pressure is adjusted such that the substrate body 110 can have an apparent density of 6.0 g/cm$^3$. The metal magnetic paste can be produced by mixing and kneading together metal magnetic particles such as Fe—Cr—Si based alloy powders with a binder resin and a solvent. The metal magnetic particles may include two or more types of metal magnetic particles having different particle sizes from each other. The binder resin is, for example, an acrylic resin or other known resins.

Figure 7:
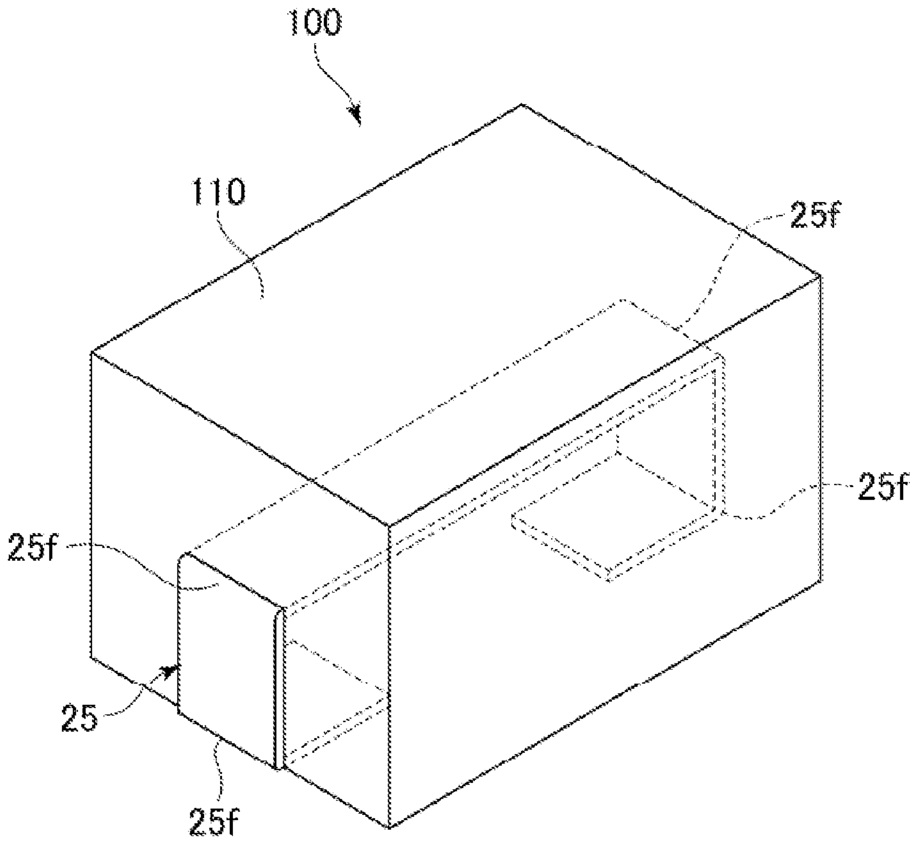
FIG. 7 is a perspective view schematically showing the intermediate body, which is produced during the process of manufacturing the coil component according to one embodiment of the invention.

Subsequently, in a step S13, the portion of the base material 125 that is exposed through the substrate body 110 is bent so as to extend along the surface of the magnetic base body 10. As a result, the conductor portion 25 having the curved portions 25*f* is made as shown in FIG. 7. The conductor portion 25 is bent at the curved portions 25*f*. When the base material 125 is a wire shaped like a line in place of a plate member shaped like a flat plate, a portion of the wire that is exposed through the substrate body 110 is stamped into a plate-shaped member, and the plate-shaped member is bent into the conductor portion 25. In the above-described manner, the intermediate body 100 is produced.

Figure 8:
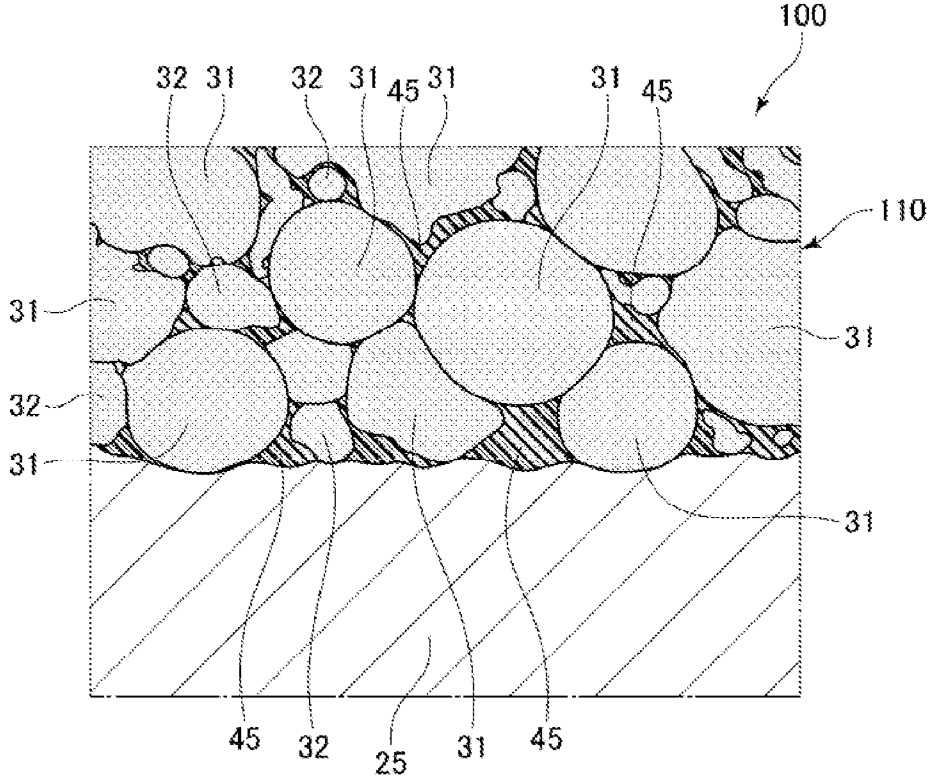
FIG. 8 is an enlarged sectional view showing, on an enlarged scale, part of the section of the intermediate body before it is heated in a first heating treatment during the process of manufacturing the coil component according to one embodiment of the present invention.

FIG. 8 shows, on an enlarged scale, a partial region of the section of the intermediate body 100 fabricated in the step S1 that is obtained by cutting the intermediate body 100 along the T-axis. The region shown in FIG. 8 corresponds to the region A in FIG. 2. As shown in FIG. 8, the substrate body 110 contains the first metal magnetic particles 31 and the second metal magnetic particles 32 having a smaller average particle size than the first metal magnetic particles 31. The binder resin, which is indicated by the reference numeral 45, fills the gaps between adjacent ones of the metal magnetic particles and the space between the conductor portion 25 and the metal magnetic particles. In the embodiment shown, the conductor portion 25 has no resin insulating coating film. Accordingly, the conductor portion 125 is in contact with the first and second metal magnetic particles 31 and 32 directly or via the binder resin 45. As described above, the surface of the conductor portion 25 may be covered with an insulating coating film made of a thermally decomposable resin. In this case, the conductor portion 25 is in contact with the first and second metal magnetic particles 31 and 32 via the resin insulating coating film or via the resin insulating coating film and the binder resin 45.

In the following step S2, the intermediate body 100 fabricated in the step S1 is subjected to a first heating treatment. More specifically, the intermediate body 100 is placed in a heating furnace, and heated in the heating furnace, for example, at 100° C. to 350° C., within an air or oxygen atmosphere, and for 30 to 120 minutes. The first heating treatment decomposes the binder resin 45 and forms a metal oxide film 50 containing an oxide of the main component metal of the conductor portion 25 (for example, copper oxide or silver oxide) on the surface of a part of the conductor portion 25 that is buried in the substrate body 110. When the surface of the conductor portion 25 is covered with the insulating coating film made of a thermally decomposable resin, the first heating treatment heats the intermediate body 100 to a temperature equal to or higher than the thermal decomposition temperature of the resin constituting the insulating coating film on the surface of the conductor portion 25. As a result, the insulating coating film on the surface of the conductor portion 25 is thermally decomposed in the first heating treatment, so that the metal oxide film 50 containing the main component metal of the conductor portion 25 is formed on the surface of the portion of the conductor portion 25 that is buried in the substrate body 110. As noted, when the conductor portion 25 is covered with the resin insulating coating film, the region that surrounds the conductor portion 25 and that is occupied by the resin insulating coating film before the first heating treatment is not formed into voids but filled with the metal oxide film 50. Since the first heating treatment is performed within an oxygen atmosphere, the first heating treatment facilitates oxidation of the main component metal contained in the conductor portion 25, so that the metal oxide film 50 is formed on the surface of the conductor portion 25 to fill the voids resulting from the decomposition of the binder resin 45 and the resin insulating coating film.

As described above, the portion of the conductor portion 25 that is buried in the substrate body 110 may be spirally shaped. When the conductor portion 25 has the insulating coating film on the surface thereof and the portion of the conductor portion 25 that is buried in the substrate body 110 is spirally shaped, the first heating treatment thermally decomposes the insulating coating film and the space occupied by the insulating coating film before the thermal decomposition is filled with the oxide produced by the oxidation of the main component metal of the conductor portion 25 (for example, copper oxide or silver oxide). In other words, when the conductor portion 25 having the insulating coating film is buried in the substrate body 110, the metal oxide film 50 is also present between adjacent ones of the turns of the spirally-shaped conductor portion 25. As interposed between the adjacent turns, the metal oxide film 50 can prevent short circuits from occurring between the adjacent turns of the conductor portion 25.

As described above, the first heating treatment degreases (debinders) the substrate body 110 and oxidizes the surface of the conductor portion 25. The heating conditions of the first heating treatment may be adapted such that the metal oxide film 50 has a thickness of 0.1 μm or more. The heating conditions of the first heating treatment are determined such that the metal magnetic particles contained in the substrate body 110 are not oxidized into an oxide coating film on the surface of the metal magnetic particles. When the first heating treatment is performed at a temperature of 100 to 350° C., the first and second metal magnetic particles 31 and 32 are constituted by a material that does not form an oxide coating film on the surface thereof at the heating temperature of 100 to 350° C.

If a zinc oxide (ZnO) suspension is applied onto the surface of the conductor portion 25 in the step S1, zinc oxide on the surface of the conductor portion 25 is taken into the metal oxide film 50 during the formation of the metal oxide film 50 on the surface of the conductor portion 25.

Figure 9:
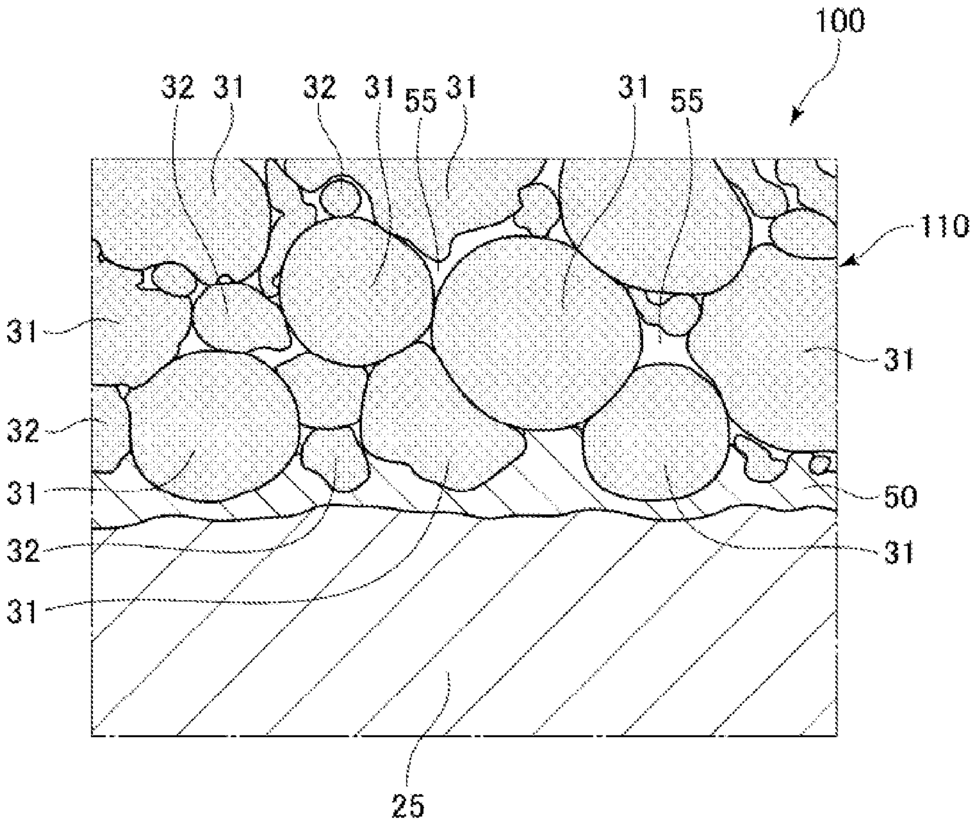
FIG. 9 is an enlarged sectional view showing, on an enlarged scale, part of the section of the intermediate body after it is heated in the first heating treatment and before it is heated in a second heating treatment during the process of manufacturing the coil component according to one embodiment of the invention.

FIG. 9 shows, on an enlarged scale, a partial region of the section of the intermediate body 100 that is obtained by cutting the intermediate body 100 along the T-axis, which is observed after the first heating treatment in the step S2. As illustrated, since the first heating treatment decomposes the binder resin, the gaps between adjacent ones of the metal magnetic particles, which are filled with the binder resin 45 before the first heating treatment, are turned into voids 55. Here, the binder resin 45 that fills the space between the conductor portion 25 and the metal magnetic particles is similarly decomposed, but the space between the conductor portion 25 and the metal magnetic particles is not turned into a void but filled with the metal oxide film 50. Since the first heating treatment is performed within an air or oxygen atmosphere, the first heating treatment facilitates oxidation of the main component metal contained in the conductor portion 25, so that the metal oxide film 50 is formed on the surface of the conductor portion 25 to fill the voids resulting from the decomposition of the binder resin 45. The metal oxide film 50 may be formed such that it covers the entire region of the surface of the conductor portion 25 that is in contact with the substrate body 110.

In the following step S3, the intermediate body 100, which has been subjected to the first heating treatment, is subjected to a second heating treatment. The second heating treatment is performed within a lower oxygen concentration atmosphere that is lower in oxygen concentration than the atmosphere in the first heating treatment and at a higher temperature than in the first heating treatment. The second heating treatment oxidizes the first and second metal magnetic particles 31 and 32 contained in the substrate body 110, as a result of which the oxide coating film 41 is formed on the surface of the first metal magnetic particles 31 and the oxide coating film 42 is formed on the surface of the second metal magnetic particles 32.

Since the first and second metal magnetic particles 31 and 32 contain a metal element that has a higher ionization tendency than the main component metal of the conductor portion 25, the oxide of the main component metal of the conductor portion 25 contained in the metal oxide film 50 is partly or entirely reduced when the first or second metal magnetic particles 31, 32 near the metal oxide film 50 produces an oxide of Fe or an oxide of a metal element other than Fe that has a higher ionization tendency than the main component metal of the conductor portion 25. Since the second heating treatment is performed within a lower oxygen concentration atmosphere, the metal element contained in the first and second metal magnetic particles 31 and 32 near the metal oxide film 50 in the substrate body 110 takes oxygen away from the oxide of the main component metal of the conductor portion 25 and produces an oxide. In other words, those of the first and second metal magnetic particles 31 and 32 that are near the conductor portion 25 are oxidized by oxygen that is at least partially provided not from the atmosphere but from the metal oxide film 50. As described above, the second heating treatment reduces the oxide of the main component metal of the conductor portion 25 contained in the metal oxide film 50, so that the metal oxide film 50 is formed into the oxide layer 60. The oxide layer 60 is formed by the reduction of the oxide contained in the metal oxide film 50. Accordingly, the oxide layer 60 is not necessarily contain, as the main component, the oxide of the main component metal of the conductor portion 25. If the second heating treatment reduces only part of the oxide of the main component metal of the conductor portion 25 contained in the metal oxide film 50, the oxide layer 60 still includes the oxide of the main component metal of the conductor portion 25 contained in the metal oxide film 50. The oxide layer 60 may contain an oxide of Fe or other metal element contained in at least one of the first metal magnetic particles 31 or the second metal magnetic particles 32. The oxide layer 60 may contain the main component metal element of the conductor portion 25, which is in the form of an oxide before the second heating treatment.

As described above, the conductor portion 25 has an insulating coating film formed on a surface thereof, and the portion of the conductor portion 25 that is buried in the substrate body 110 may be spirally shaped. In this case, in the intermediate body 100 before the second heating treatment, the metal oxide film 50 is present between adjacent ones of the turns of the spirally shaped conductor portion 25. The main component metal of the conductor portion 25 contained in the metal oxide film 50 interposed between the adjacent ones of the turns of the spirally-shaped conductor portion 25 is at a large distance from the first or second metal magnetic particles 31, 32 and is thus less likely to be reduced by Fe or other metal element contained in the first or second metal magnetic particles 31, 32. For this reason, the oxide of the main component metal of the conductor portion 25 remains in relatively higher abundance in the region of the metal oxide film 50 between adjacent ones of the turns of the spirally-shaped conductor portion 25 than in the other region of the metal oxide film 50 adjacent to the first or second metal magnetic particles 31, 32. When thermal diffusion causes the metal element (for example, Fe or Cr) that has a higher ionization tendency than the main component metal of the conductor portion 25 and that is contained in the first or second metal magnetic particles 31, 32 to move and reach even the region between adjacent ones of the turns of the spirally-shaped conductor portion 25, the metal element that has a higher ionization tendency than the main component metal of the conductor portion 25 may also reduce the main component metal of the conductor portion 25 between adjacent ones of the turns of the spirally-shaped conductor portion 25. In other words, the metal oxide film 50 present between adjacent ones of the turns of the spirally-shaped conductor portion 25 may be partly reduced by the second heating treatment to the oxide layer 60.

When the step S1 applies a zinc oxide (ZnO) suspension onto the surface of the conductor portion 25, the resulting oxide layer 60 contains zinc oxide in addition to the oxide of the metal element contained in at least one of the first metal magnetic particles 31 or the second metal magnetic particles 32. The zinc oxide can contribute to densify the oxide layer 60, which results from the second heating treatment.

The second heating treatment is performed at a temperature of approximately 600° C. to 900° C., within a mixed atmosphere of nitrogen and oxygen for a duration of 30 to 120 minutes, for example. The oxygen concentration in the mixed atmosphere is 100 ppm to 2000 ppm. As disclosed in Japanese Patent Application No. 2020-216302 (filed on Dec. 25, 2020), which is filed by the same applicant as the present application, if a distance of 2 mm or more is provided in the intermediate body 100 between the metal oxide film 50 and the surface of the substrate body 110, heating the intermediate body 100 within a mixed atmosphere of nitrogen and oxygen with an oxygen concentration of 2000 ppm, at a temperature of approximately 800° C., and for a duration of 60 minutes can entirely reduce the main component metal of the conductor portion 25 contained in the metal oxide film 50 having a thickness of 0.5 μm.

By setting the heating temperature of the second heating treatment within the range of 600° C. to 900° C., the conductor portion 25 can be successfully annealed. Before the second heating treatment, the curved portions 25*f* of the conductor portion 25 experience residual stress due to the bending performed to form the base material 125 into the conductor portion 25. Since the second heating treatment results in annealing the conductor portion 25, this can relieve the residual stress generated by the bending. As noted, the second heating treatment can form the oxide coating films 41 and 42 on the surface of the metal magnetic particles 31 and 32 so that the substrate body 110 is formed into the magnetic base body 10, form the metal oxide film 50 into the oxide layer 60, and additionally relieve the residual stress from the conductor portion 25. Stated differently, the heating treatment, which is performed to oxidize the metal magnetic particles contained in the substrate body 110 so that the magnetic base body 10 is formed, can relieve the residual stress from the conductor portion 25.

When the metal oxide film 50 contains zinc oxide, the second heating treatment reduces at least part of the zinc oxide. Since the melting point of zinc is lower than the heating temperature of the second heating treatment, the second heating treatment melts the zinc, which results from the reduction. When there are voids between the metal oxide film 50 and the metal magnetic particles 31 and/or the metal magnetic particles 32, the molten zinc moves into the voids and can thus fill at least part of the voids. In this manner, the second heating treatment can result in reduced voids between the oxide layer 60 and the first and/or second metal magnetic particles 31, 32. Accordingly, the present embodiment can further prevent, when the coil component 1 is in use, the ambient air and the moisture in the air from reaching the buried portion 25*a*.

In the above-described manner, the coil component 1 is produced. The method of manufacturing the coil component 1 may include additional steps in addition to the steps S1 to S3. For example, the magnetic base body 10 fabricated by the heating treatment step is subjected to a polishing treatment such as barrel polishing as necessary.

Figure 10:
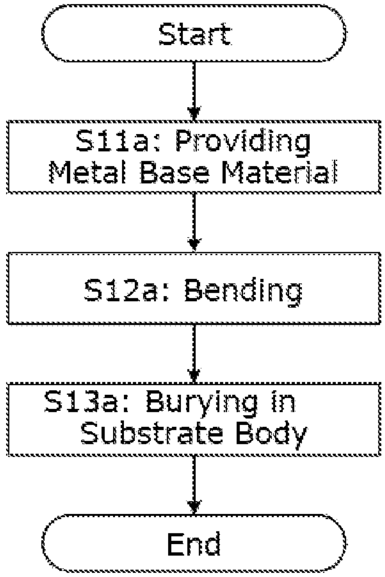
FIG. 10 is a flow chart showing a process of providing an intermediate body according to one embodiment of the present invention.

The method of manufacturing the coil component 1 described with reference to FIGS. 4 and 5 can be modified in various manners. For example, the method of manufacturing the coil component 1 can be modified by adaptively changing the step S1 of providing the intermediate body 100. FIG. 10 shows a modification example of the step S1 of providing the intermediate body 100. As shown in FIG. 10, the intermediate body 100 can be made by providing the base material 125 in a step S11*a*, bending the base material 125 into the conductor portion 25 in a step S12*a* and burying the conductor portion 25 into the substrate body 110 in a step S13*a*. As described above, the bending of the base material 125 may precede the burying of the base material 125 into the substrate body 110.

Figure 11:
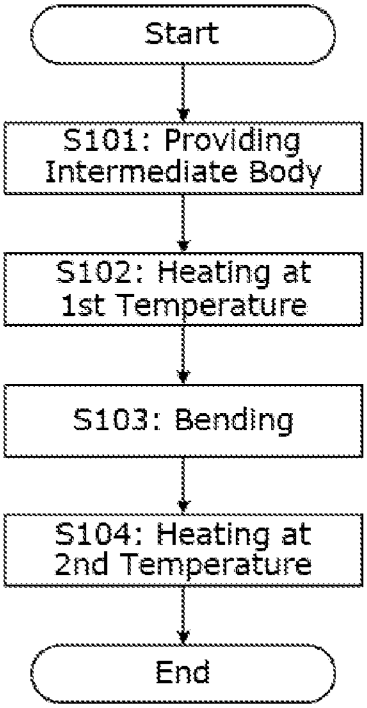
FIG. 11 is a flow chart showing a process of manufacturing a coil component according to one embodiment of the present invention.

The step of bending the base material 125 and the other steps can be reordered as necessary. The bending of the base material 125 can take place at any point of time as long as it precedes the second heating treatment. FIG. 11 shows a flow of steps included in a manufacturing method relating to another embodiment of the present invention, in which the bending is performed at a different timing. According to the manufacturing method shown in FIG. 11, the bending of the base material 125 is performed after the first heating treatment is performed on the intermediate body 100. FIG. 11 shows a method of manufacturing the coil component 1 relating to another embodiment of the invention. According to FIG. 11, the bending of the base material 125 is performed after the first heating treatment. More specifically, in the first step S101, the intermediate body 100 is provided that includes a substrate body 110 made from a magnetic material and the metal base material 125 partly buried in the substrate body 110. The step S101 is performed in the same manner as the step S1. The base material 125 is placed within a mold, a metal magnetic paste containing metal magnetic particles is poured into the mold where the base material 125 is placed, and predetermined molding pressure is applied to the metal magnetic paste in the mold. As shown in FIG. 6, the step S101 results in manufacturing the intermediate body 100 including the substrate body 110 and the metal base material 125 partly buried in the substrate body 110.

In the following step S102, the intermediate body 100 fabricated in the step S101 is subjected to the first heating treatment. The first heating treatment performed in the step S102 can be performed under the same conditions as the first heating treatment performed in the step S2. More specifically, the intermediate body 100 fabricated in the step S101 is placed in a heating furnace, and heated in the heating furnace, for example, at 100° C. to 350° C., within an air or oxygen atmosphere, and for 30 to 120 minutes. The first heating treatment in the step S102 decomposes the binder resin 45 and forms the metal oxide film 50 containing an oxide of the main component metal of the metal material of the base material 125 (for example, copper oxide or silver oxide) on the surface of a part of the base material 125 that is buried in the substrate body 110.

In the following step S103, the base material 125, which is contained in the intermediate body 100 that has been subjected to the first heating treatment, is bent into the conductor portion 25. The bending can form the base material 125 into the conductor portion 25 having the curved portions 25*f*, as shown in FIG. 7.

In the following step S104, the intermediate body 100, which has the conductor portion 25 that has been formed by the bending, is subjected to the second heating treatment. The second heating treatment performed in the step S104 can be performed under the same conditions as the second heating treatment performed in the step S3. More specifically, the intermediate body 100, which has the base material 125 that has been bent in the step S103, is subjected to a heating treatment within a low oxygen concentration atmosphere that has a lower oxygen concentration (for example, an oxygen concentration of 100 to 2000 ppm) than the atmosphere used in the first heating treatment and at a temperature (for example, approximately 600° C. to 900° C.) higher than the temperature at which the first heating treatment is performed. The second heating treatment oxidizes the first and second metal magnetic particles 31 and 32 contained in the substrate body 110, as a result of which the oxide coating film 41 is formed on the surface of the first metal magnetic particles 31 and the oxide coating film 42 is formed on the surface of the second metal magnetic particles 32. In this way, the magnetic base body 10 is completed. The second heating treatment reduces the oxide of the main component metal of the conductor portion 25 contained in the metal oxide film 50, so that the metal oxide film 50 is formed into the oxide layer 60.

The step S104 can anneal the conductor portion 25, while concurrently generating the magnetic base body 10 and the oxide layer 60. Before the second heating treatment, the curved portions 25*f* of the conductor portion 25 experience residual stress due to the bending performed to form the base material 125 into the conductor portion 25. The second heating treatment in the step S104 can anneal the conductor portion 25, thereby relieving the residual stress from the conductor portion 25.

Next, advantageous effects of the foregoing embodiments will be described. According to the embodiments of the present invention, the second heating treatment at the second temperature can successfully anneal the conductor portion 25 formed by the bending, thereby relieving the residual stress from the conductor portion 25. In this manner, the coil component 1 can achieve enhanced mechanical strength.

According to the embodiments of the present invention, while annealing the conductor portion 25, the second heating treatment can concurrently oxidize the first and second metal magnetic particles 31 and 32 so that the substrate body 110 is formed into the magnetic base body 10. If the annealing of the conductor portion 25 is separately performed from the heating designed to form the substrate body 110 into the magnetic base body 10, the independent and additional step of heating for the purpose of the annealing is required. This complicates the process of manufacturing the coil component 1 and requires more energy for successfully manufacturing the coil component 1. If heating is performed for the purpose of annealing the conductor portion 25 in addition to the heating designed to oxidize the first and second metal magnetic particles 31 and 32, the first and second metal magnetic particles 31 and 32 are excessively oxidized, which may inadvertently compromise the magnetic characteristics of the magnetic base body 10. According to the embodiments of the present invention, the second heating treatment anneals the conductor portion 25 and concurrently forms the substrate body 110 into the magnetic base body 10, which can solve or relieve the above-described problems.

Since the first and second metal magnetic particles 31 and 32 contain a metal (for example, Fe or Cr) having a higher ionization tendency than the main component metal of the conductor portion 25, the second heating step causes the first and second metal magnetic particles 31 and 32 surrounding the conductor portion 25 to take oxygen away from the metal oxide film 50 formed on the surface of the conductor portion 25. This oxidizes the first and second metal magnetic particles 31 and 32. In addition, most of the oxygen originated from the atmosphere is consumed by the first and second metal magnetic particles 31 and 32 before reaching the conductor portion 25 buried in the substrate body 110. Accordingly, the oxidation of the conductor portion 25 is prevented. Furthermore, since the second heating treatment is performed within a low oxygen concentration atmosphere having an oxygen concentration of 100 to 2000 ppm, this can prevent the oxygen from being fed to the conductor portion 25. As described above, the embodiments of the present invention can hamper the increase in electrical resistance that is caused by the oxidation of the conductor portion 25.

According to the embodiments of the present invention, the surface of the buried portion 25*a* of the conductor portion 25 is covered with the insulating oxide layer 60. Therefore, the embodiments can prevent occurrence of short circuits between the conductor portion 25 and the metal magnetic particles contained in the magnetic base body 10 (for example, the first and second metal magnetic particles 31 and 32).

According to the embodiments of the present invention, the oxide layer 60 covers the surface of the buried portion 25*a* of the conductor portion 25 and fills the space between the conductor portion 25 and the metal magnetic particles constituting the magnetic base body 10. Accordingly, the embodiments can prevent the ambient air and the moisture in the air from entering the magnetic base body 10 and reaching the conductor portion 25. In addition, since the oxide layer 60 contains an oxide of the metal element constituting the metal magnetic particles, the relative permeability of the oxide layer 60 is higher than the relative permeability of the conventional resin insulating coating film. The coil component 1 described above can thus provide for high dielectric strength and high resistance against oxidation and also reduce compromise of magnetic characteristics as it includes the oxide layer 60.

In one or more embodiments of the present invention, the oxide layer 60 contains zinc oxide, which can contribute to densify the oxide layer 60. This can further prevent ambient air and moisture in the air from reaching the conductor portion 25.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituents from performing the functions of the constituent identified by other numbers.

What is claimed is:

1. A method of manufacturing a coil component, comprising steps of:

providing an intermediate body, the providing of the intermediate body including (i) preparing a base material having a flat plate shape or a wire shape, (ii) bending the base material to form a conductor portion, (iii) preparing a metal magnetic paste containing a resin and a plurality of metal magnetic particles mainly composed of iron, and (iv) applying a molding pressure to the metal magnetic paste covering the base material to form the intermediate body including a substrate body containing the plurality of metal magnetic particles and the conductor portion;

heating the intermediate body at a first temperature ranging from 100 to 350° C.; and after the heating at the first temperature, heating the intermediate body at a second temperature higher than the first temperature to anneal the conductor portion and to form a magnetic base body from the substrate body, the second temperature ranging from 600 to 900° C., wherein the magnetic base body includes an oxide coating film containing iron oxide on a surface of each of the metal magnetic particles.

2. The method of claim 1, wherein the heating at the first temperature forms an oxide film containing an oxide of the metal to cover a surface of the conductor portion, and wherein the heating at the second temperature reduces at least part of the oxide of the metal contained in the oxide film.

3. The method of claim 1, wherein, in the heating at the second temperature, each of the metal magnetic particles binds to an adjacent one of the metal magnetic particles via the oxide coating film, so that the magnetic base body is formed.

4. The method of claim 1, wherein, in the heating at the second temperature, the intermediate body is heated within an atmosphere with a lower oxygen concentration than in the heating at the first temperature.

5. The method of claim 1, wherein the base material is covered with a thermally decomposable insulating coating film, and wherein the insulating coating film is decomposed in the heating at the first temperature.

6. The method of claim 1, wherein, the providing of the intermediate body includes applying a suspension containing zinc oxide onto a surface of the base material.

7. The method of claim 6, wherein, in the heating at the first temperature, an oxide film containing an oxide of the metal is formed to cover a surface of the conductor portion, and wherein, in the heating at the second temperature, an oxide layer is formed from the oxide film, the oxide layer containing zinc oxide.

8. The method of claim 1, wherein the conductor portion has a spiral shape.

9. The method of claim 1, wherein the base material is mainly composed of Cu.

10. The method of claim 1, wherein the heating at the second temperature is performed within an atmosphere having an oxygen concentration of 100 to 2000 ppm.

11. A method of manufacturing a coil component, comprising steps of:

providing an intermediate body, the providing of the intermediate body including (i) preparing a base material having a flat plate shape or a wire shape, (ii) preparing a metal magnetic paste containing a resin and plurality of metal magnetic particles, and (iii) applying a molding pressure to the metal magnetic paste covering the base material to form the intermediate body including a substrate body containing the plurality of metal magnetic particles and the base material;

heating the intermediate body at a first temperature ranging from 100 to 350° C.;

after the heating at the first temperature, bending the base material into a conductor portion; and after the bending, heating the intermediate body at a second temperature higher than the first temperature to anneal the conductor portion and to form a magnetic base body from the substrate body, the second temperature ranging from 600 to 900° C., wherein the magnetic base body includes an oxide coating film containing iron oxide on a surface of each of the metal magnetic particles.

12. The method of claim 11, wherein the heating at the first temperature forms an oxide film containing an oxide of the metal to cover a surface of the conductor portion, and wherein the heating at the second temperature reduces at least part of the oxide of the metal contained in the oxide film.

13. The method of claim 11, wherein, in the heating at the second temperature, each of the metal magnetic particles binds to an adjacent one of the metal magnetic particles via the oxide coating film, so that the magnetic base body is formed.

14. The method of claim 11, wherein, in the heating at the second temperature, the intermediate body is heated within an atmosphere with a lower oxygen concentration than in the heating at the first temperature.

15. The method of claim 11, wherein the base material is covered with a thermally decomposable insulating coating film, and wherein the insulating coating film is decomposed in the heating at the first temperature.

16. The method of claim 11, wherein, the providing of the intermediate body includes applying a suspension containing zinc oxide onto a surface of the base material.

17. The method of claim 16 wherein, in the heating at the first temperature, an oxide film containing an oxide of the metal is formed to cover a surface of the conductor portion, and wherein, in the heating at the second temperature, an oxide layer is formed from the oxide film, the oxide layer containing zinc oxide.

18. The method of claim 11, wherein the conductor portion has a spiral shape.

19. The method of claim 11, wherein the base material is mainly composed of Cu.

20. The method of claim 11, wherein the heating at the second temperature is performed within an atmosphere having an oxygen concentration of 100 to 2000 ppm.

* * * * *